3,728,331
PROCESS FOR REDUCING THE VISCOSITY OF A CELLULOSE ETHER WITH HYDROGEN PEROXIDE
Albert B. Savage, Midland, Mich., assignor to the Dow Chemical Company, Midland, Mich.
No Drawing. Filed Apr. 4, 1969, Ser. No. 813,720
Int. Cl. C08b 11/00
U.S. Cl. 260—231 R                    10 Claims

ABSTRACT OF THE DISCLOSURE

A controlled reduction of the viscosity of a cellulose ether is achieved by blending an essentially dry, free-flowing particulate cellulose ether with a predetermined amount of hydrogen peroxide, heating the blended cellulose ether at about 50°–150° C. to react substantially all the added hydrogen peroxide, and recovering a lower viscosity, particulate cellulose ether having an intrinsic fluidity greater than the initial cellulose ether. High yields and a readily controlled viscosity reduction are obtained.

BACKGROUND

For many industrial applications of cellulose ethers, the solution concentration and viscosity are important considerations. The solubility of a water-soluble cellulose derivative is dependent on its molecular weight or degree of polymerization as measured most conveniently by the viscosity of a standard solution. To meet varied industrial requirements, sizable stocks of different viscosity grade cellulose ethers are required.

Traditionally, the viscosity of a cellulose ether has been controlled by alkaline oxidation of the cellulose prior to or during etherification as disclosed by Richter U.S. Pat. 2,112,116, Klug et al. U.S. Pat. 2,512,338, and Boddicker et al. U.S. Pat. 2,749,336 use hydrogen peroxide or alkali metal peroxides during a slurry etherification to control viscosity. However, these processes have a common disadvantage in the substantial yield losses incurred when the resulting cellulose ether is washed to remove water-soluble by-products and impurities.

Recently, a process for treating a cellulose derivative with hydrogen peroxide at a later processing stage has been described by French Pat. 1,484,493. In this process aqueous hydrogen peroxide is added after etherification to a wet, washed cellulose ether before final drying. Then the product is heated at 100°–250° C. to combine drying and viscosity reduction through peroxide depolymerization. Although solubility losses are minimized, the intermediate product prior to peroxide treatment is not in a finished form suitable for storage.

STATEMENT OF THE INVENTION

It has now been discovered that an efficient and easily controlled viscosity reduction can be accomplished using a stable, essentially dry, particulate cellulose ether of appropriate viscosity grade and intrinsic fluidity. In this process, an essentially dry, particulate cellulose ether containing less than about 5 weight percent water is blended with a predetermined amount of hydrogen peroxide and heated briefly at about 50°–156° C. to yield a free flowing cellulose ether with a controlled reduction in viscosity. For example, a single stock methyl cellulose ether having a standard 2 percent aqueous solution viscosity of 1500 cps. at 20° C., can be treated by this process with minimum time and equipment to yield a dry finished product with a predetermined standard viscosity ranging from 4 cps. or less to about 500 cps.

More specifically the improved process comprises: (A) Blending an essentially dry, free flowing, particulate cellulose ether having a water content less than about 5 weight percent with a predetermined amount of hydrogen peroxide; (B) heating the blended cellulose ether at about 50°–150° C. for a time sufficient to react substantially all the added hydrogen peroxide; and (C) recovering a free flowing cellulose ether having a lower viscosity than the untreated cellulose ether.

Preferably a well-agitated mass of cellulose ether having a standard 2% aqueous solution viscosity of 20,000 cps. or less at 20° C. and pH 7, is sprayed with 10–50 weight percent equeous hydrogen peroxide and the blended mixture is heated at about 85°–125° C. until the peroxide is consumed. Normally no further treatment is required before use or packaging.

GENERAL DESCRIPTION

Cellulose ethers

This process is applicable to a wide variety of ionic and non-ionic cellulose ethers. For example, it can be used with methyl cellulose, ethyl cellulose, hydroxyalkyl cellulose, carboxymethyl cellulose, sulfoalkyl cellulose, and similar cellulose ethers as well as mixed ionic and non-ionic cellulose ethers such as methylcarboxymethyl cellulose, hydroxypropylcarboxymethyl cellulose, etc.

The process is particularly applicable to the treatment of water-soluble cellulose ethers having a standard 2% aqueous solution viscosity of 20,000 cps. or less at 20° C. and pH 7 to yield water-soluble ethers having 2% viscosities of about 2–4000 cps.

Since only small amounts of peroxide are required, effective blending of the reactants is extremely important. The initial cellulose ether should be in an essentially dry and free flowing particulate form. Powdered ethers with a particle size finer than about 20 mesh U.S. standard screen are most suitable. Although small amounts of moisture in the cellulose ether can be tolerated without impairing its blending characteristics, the moisture content of the untreated cellulose ether should be less than about 5 weight percent prior to treatment with the aqueous hydrogen peroxide. A higher moisture content coupled with the water added by the aqueous hydrogen peroxide can prevent uniform blending of the reactants through agglomeration of the particles.

Intrinsic fluidity

As a means for measuring the viscosity reduction and process control, the change in intrinsic fluidity of the cellulose derivative, e.g. $\Delta\phi$, is particularly suitable. Basically the viscosity reduction is achieved by controlled oxidative depolymerization or scission of the backbone cellulose ether polymer chain. Since the intrinsic fluidity is directly related to the number average degree of polymerization, the change in intrinsic fluidity is a measure of the chain scission. The intrinsic fluidity is tself the reciprocal of the intrinsic viscosity and has a bi-logarithmic relationship to the standard 2 percent aqueous solution viscosity. The relation between these quantities is shown in Table 1.

TABLE 1 [a]

| Viscosity grade 2%, 20° C., cp. | Intrinsic viscosity $[\eta]$, dl./g. | Intrinsic fluidity $\phi$, g./dl. | Number average degree of polymerization, $DP_N$ | Number average molecular weight, $M_N$ |
|---|---|---|---|---|
| 10 | 1.4 | 0.715 | 70 | 13,000 |
| 40 | 2.05 | 0.487 | 110 | 20,000 |
| 100 | 2.65 | 0.377 | 140 | 26,000 |
| 400 | 3.90 | 0.257 | 220 | 41,000 |
| 1,500 | 5.7 | 0.175 | 340 | 63,000 |
| 4,000 | 7.5 | 0.133 | 460 | 86,000 |
| 8,000 | 9.3 | 0.108 | 580 | 110,000 |
| 15,000 | 11.0 | 0.090 | 650 | 320,000 |
| 19,000 | 12.0 | 0.083 | 750 | 140,000 |

[a] From "Encyclopedia of Polymer Science and Technology," vol. 3, Interscience, New York, 1965, p. 504.

The present process is applicable to the treatment of essentially dry, free flowing particulate cellulose ethers having an initial intrinsic fluidity at 20° C. of about 0.08–0.90 g./dl. Furthermore, the increase in intrinsic fluidity obtained by this hydrogen peroxide treatment is directly proportional to the amount of peroxide used. Thus it is possible to predetermine the amount of hydrogen peroxide to use for a desired change in intrinsic fluidity or viscosity.

Oxidizing agent

Hydrogen peroxide is the preferred oxidizing agent because of its selective scission of the cellulose polymer chain, freedom from undesired by-products, and availability. It is conveniently applied as a 30–35 wt. percent aqueous solution although concentrations of 10–50% can be easily used. Aqueous concentrations less than 10% are less satisfactory because of the large amount of water added with the peroxides. Concentrations greater than 50% are preferably diluted to about 30–35%.

The pH of the peroxide solution is not a critical factor. However, in some systems the peroxide oxidation is more effective under mild alkaline conditions. A small amount of alkali, such as sodium carbonate or sodium hydroxide, can be added if desired to give a peroxide solution pH of about 8–11, or a small amount of an alkali metal peroxide such as sodium peroxide can be used. Also, if desired, a soluble salt of a metal which forms an oxygen carrying anion such as cobalt, iron, manganese or lead can be added in minor amount to catalyze the chain scission as described in Klug et al. U.S. Pat. 2,512,338.

Process conditions

Blending of the essentially dry, free flowing particulate cellulose ether with the predetermined amount of hydrogen peroxide can be achieved with conventional mixers. The type of mixer is not critical so long as cellulose ether is thoroughly blended with the peroxide. Suitable mixers include kneading blenders, continuous screw mixers, conveyors or rotary drum blenders.

Preferably the hydrogen peroxide is applied to the well-agitated mass of cellulose ether as a fine spray amounting to about 0.1–5.0 weight percent hydrogen peroxide based on dry cellulose ether. Such an amount of hydrogen peroxide will give after heating an increase in intrinsic fluidity of at least 0.05 g./dl. and usually about 0.1–0.5 g./dl. depending on the specific material and conditions. For a greater increase in intrinsic fluidity, stepwise addition of the hydrogen peroxide to the cellulose ether is recommended to avoid the hazards of too high initial peroxide concentrations.

Initial scission of the cellulose ether after blending with hydrogen peroxide occurs at room temperature. However, significant levels of residual peroxide are found even after 2 months at 20°–30° C. Therefore, to eliminate residual peroxides and provide a stable viscosity grade product, the treated cellulose ether should be heated shortly after blending with the peroxide to about 50°–150° C. for a time sufficient to decompose essentially all the peroxide. Generally, a temperature of about 85°–125° C. is preferred. A heating period of about 0.5–2 hrs. is normally sufficient to react substantially all the hydrogen peroxide. Conventional analyses for hydrogen peroxide can be used for control.

The small amount of water added with the peroxide and formed during its reaction will not normally necessitate further drying. Indeed the process can be carried out in a closed system. The final product with its viscosity adjusted as required for a particular application can be used or packaged without further treatment. However, if desired, conventional surface treatments to improve dispersibility and rate of dissolution can also be applied.

The following examples illustrate further this process. Unless otherwise specified all parts and percentages are by weight and the viscosities are determined in aqueous solution at 20° C. by ASTM methods D 1347–64 and D 2363–65T.

EXAMPLE 1

Treatment of 400 cps. cellulose ether (A) A Banbury mixer was charged with 100 parts of a dry, finely powdered hydroxypropylmethylcellulose ether having a methoxyl DS of about 1.6 and a hydroxypropyl MS of about 0.10, a standard 2% aqueous solution viscosity of 400 cps. and an intrinsic fluidity, $\phi$, of 0.260. The cellulose ether contained about 3% water and had a particle size finer than 30 mesh. The agitated cellulose ether was spray treated with 3 parts of 3% aqueous hydrogen peroxide. Portions of the treated cellulose ether were heated at 120° C. and the decrease in viscosity was followed by standard Ubbelohde viscosity measurements. Typical results are given in Table 2.

TABLE 2.—TREATMENT OF 400 CPS. CELLULOSE ETHER

| Run | Treatment H₂O₂ | T.,° C./hrs. | 2% viscosity, cps. | $\phi$, g./dl.ᵃ | Δ$\phi$ |
|---|---|---|---|---|---|
| 2-1 | None | | 400 | 0.260 | |
| 2-2 | 0.9 | 25/2 | 85 | 0.400 | 0.14 |
| 2-3 | 0.9 | 120/0.5 | 48 | 0.475 | 0.21 |
| 2-4 | 0.9 | 120/1.0 | 50 | 0.465 | 0.20 |
| 2-5 | 0.9 | 120/1.5 | 42 | 0.490 | 0.23 |
| 2-6 | 0.9 | 120/2.0 | 37 | 0.510 | 0.25 |

ᵃ Intrinsic fluidity.

(B) In a multiple stage treatment, 200 parts of the same finely powdered 400 cps. hydroxypropylmethyl cellulose was sprayed in a rotary bladed mixture with 6 parts of 30% aqueous $H_2O_2$. After blending at room temperature for about a half hour, another 6 parts of $H_2O_2$ was applied and blended. A sample of the treated cellulose ether was removed and the remainder heated at 120° C. for 2 hours. Results are given in Table 3.

TABLE 3.—TREATMENT OF 400 CPS. CELLULOSE ETHER

| Run | T.,° C./hrs. | 2% viscosity, cps. | $\phi$, g./dl. | Δ$\phi$ |
|---|---|---|---|---|
| 3-1 | Control | 400 | 0.257 | |
| 3-2 | 25–30/2 | 69 | 0.43 | 0.17 |
| 3-3 | 120/2 | 18 | 0.62 | 0.36 |

(C) In another experiment with the powdered 400 cps. hydroxypropylmethyl cellulose, 1.0 and 1.5 parts of 30% $H_2O_2$ were added per 100 parts ether followed by heating for 1 hour at 105° C.

TABLE 4.—TREATMENT OF 400 CPS. CELLULOSE ETHER

| Run | Percent H₂O₂ | T.,° C./hr. | 2% viscosity, cps. | $\phi$, g./dl. | Δ$\phi$ |
|---|---|---|---|---|---|
| 4-1 | None | 25 | 342 | 0.27 | |
| 4-2 | 0.9 | 90/2 | 109 | 0.37 | 0.10 |
| 4-3 | 0.9 | 105/1 | 108 | 0.37 | 0.10 |
| 4-4 | 1.8 | 105/1 | 62 | 0.43 | 0.16 |
| 4-5 | 2.0 | 90/2 | 46 | 0.47 | 0.20 |

EXAMPLE 2

Other cellulose ethers (A) To demonstrate the flexibility of the process, a series of finely powdered hydroxypropylmethyl cellulose ethers, having the same substitution as the ether of Example 1 but varying initial viscosities, were mixed in a Banbury mixer at room temperature and sprayed with the required amount of 30% $H_2O_2$, blended for 15 min. and then transferred to closed bottles and heated for 1 hour at 105°–115° C. Typical results are given in Table 5.

TABLE 5.—TREATMENT OF HYDROXYPROPYLMETHYL CELLULOSE

| Initial viscosity, cps. | Percent $H_2O_2$ | T., °C./hr. | Product viscosity, cps. |
|---|---|---|---|
| 15,000 | 0.2 | 105/1 | 4,000 |
|  | 0.6 | 105/1 | 1,500 |
|  | 1.5 | 105/1 | 400 |
|  | 3.0 | 105/1 | 100 |
| 4,000 | 0.2 | 105/1 | 1,500 |
|  | 1.0 | 105/1 | 400 |
|  | 3.0 | 105/1 | 100 |
| 100 | 2.5 | 115/1 | 25 |
|  | 5.0 | 115/1 | 15 |
|  | 7.5 | 115/1 | 10 |
|  | a 9.0 | 115/2 | 5.1 | a Added in 3 portions with 0.2 p.p.m. $Co^{+3}$.

(B) In a similar manner 100 parts of another powdered hydroxypropylmethyl cellulose (hydroxypropyl MS—0.15; methyl DS—1.8) having an initial viscosity of 7000 cps. was treated with 0.9% $H_2O_2$.

TABLE 6.—TREATMENT OF 7000 CPS. CELLULOSE ETHER

| Run | T., °C./hrs. | 2% viscosity, cps. | $\phi$, g./dl. | $\Delta\phi$ |
|---|---|---|---|---|
| 6-1 | Control | 7,000 | 0.115 | |
| 6-2 | 25/2 | 1,300 | 0.185 | 0.07 |
| 6-3 | 120/2 | 88 | 0.400 | 0.08 |

(C) A finely powdered hydroxybutylmethyl cellulose with an initial viscosity of 12,340 cps. was treated with 0.9% $H_2O$ and heated. Then the treatment was repeated.

TABLE 7.—TREATMENT OF HYDROXYBUTYLMETHYL CELLULOSE

| Run | T., °C./hrs. | 2% viscosity, cps. | $\phi$, g./dl. | $\Delta\phi$ |
|---|---|---|---|---|
| 7-1 | Control | 12,340 | 0.095 | |
| 7-2 | 120/2 | 99 | 0.28 | 0.18 |
| 7-3 | 2-120/2 | 24 | 0.56 | 0.28 |

(D) Similar results have been obtained using aqueous $H_2O_2$ to reduce the viscosity of hydroxyethyl cellulose and sodium carboxymethyl cellulose.

EXAMPLE 3

Process condition (A) The effect of the heating temperature and time on the viscosity reduction is shown in Table 8 using commercial hydroxypropylmethyl cellulose.

TABLE 8.—TREATMENT OF 100 CPS. CELLULOSE ETHER

| Run | Percent $H_2O_2$ | T., °C./hr. | 2% viscosity, cps. | $\phi$, g./dl. | $\Delta\phi$ |
|---|---|---|---|---|---|
| 8-1 | 0 | Control | 101 | 0.38 | |
| 8-2 | 0.9 | 25/1 | 50 | 0.47 | 0.09 |
| 8-3 | 0.9 | 60/1 | 50 | 0.47 | 0.09 |
| 8-4 | 0.9 | 90/1 | 41 | 0.49 | 0.12 |
| 8-5 | 0.9 | 100/1 | 33 | 0.52 | 0.13 |
| 8-6 | 0.9 | 110/1 | 25 | 0.57 | 0.19 |
| 8-7 | 0.9 | 120/1 | 19 | 0.61 | 0.23 |

(B) In a similar experiment using a commercial 400 cps. hydroxypropylmethyl cellulose, the pH of the 30% aqueous $H_2O_2$ was buffered at pH 4.0, 7.0, and 10.0 using standard buffers without any great effect on the final product viscosity and intrinsic fluidity.

I claim:

1. In a process for reducing the viscosity of a cellulose ether by reaction with hydrogen peroxide, the improvement which consists essentially of:
   (A) blending an essentially dry, free-flowing particulate cellulose ether having a water content less than about 5 wt. percent with a predetermined amount of 10–50% aqueous hydrogen peroxide to give a treated, free-flowing, particulate cellulose ether;
   (B) heating the treated, free-flowing, particulate cellulose ether at about 50°–150° C. for a time sufficient to react substantially all the added hydrogen peroxide; and
   (C) recovering a free-flowing, particulate cellulose ether having a lower viscosity as a 2 wt. percent solution at 20° C. and pH 7 than the untreated cellulose ether.

2. The process of claim 1 where the initial cellulose ether has a particle size finer than about 20 mesh U.S. standard screen.

3. The process of claim 1 where the initial cellulose ether has a 2% aqueous solution viscosity at 20° C. and pH 7 less than about 20,000 cps.

4. The process of claim 1 where the initial cellulose ether has an intrinsic fluidity at 20° C. of about 0.08–0.90 g./dl. and the recovered cellulose ether has an intrinsic fluidity at least 0.05 g./dl. greater.

5. The process of claim 1 where the cellulose ether is treated with about 0.1–5.0 weight percent hydrogen peroxide applied by spraying an agitated mass of the cellulose ether with about 10–50 weight percent aqueous hydrogen peroxide.

6. The process of claim 1 where the cellulose ether blended with aqueous hydrogen peroxide is heated at about 85°–125° C. to complete the hydrogen peroxide reaction.

7. The process of claim 1 where the cellulose ether is a non-ionic alkyl cellulose ether.

8. The process of claim 1 where the cellulose ether is a $C_2$–$C_4$ hydroxyalkyl cellulose ether.

9. The process of claim 1 where the cellulose ether is a carboxymethyl cellulose ether.

10. The process of claim 1 where a water-soluble hydroxypropylmethyl cellulose having a particle size finer than about 20 mesh and a 2% aqueous solution viscosity at 20° C. less than about 4,000 cps. is blended at about room temperature with about 0.2–3.0 wt. percent of 10–50% aqueous hydrogen peroxide, and thereafter the blended cellulose ether is heated at about 85°–125° C. to obtain a water-soluble cellulose ether having a 2% aqueous solution viscosity less than about 1500 cps.

References Cited

UNITED STATES PATENTS

| 2,512,338 | 6/1950 | Klug | 260—231 |
| 2,912,431 | 11/1959 | Leonard et al. | 260—232 |

FOREIGN PATENTS

| 1,049,636 | 11/1966 | Great Britain | 260—231 |
| 1,481,493 | 4/1967 | France | 260—231 |
| 1,139,637 | 1/1969 | Great Britain | 260—231 |

DONALD E. CZAJA, Primary Examiner

M. I. MARQUIS, Assistant Examiner

U.S. Cl. X.R.

260—231 A, 232